E. M. MORGAN.
DRIVE-CHAIN.
No. 180,907.  Patented Aug. 8, 1876.
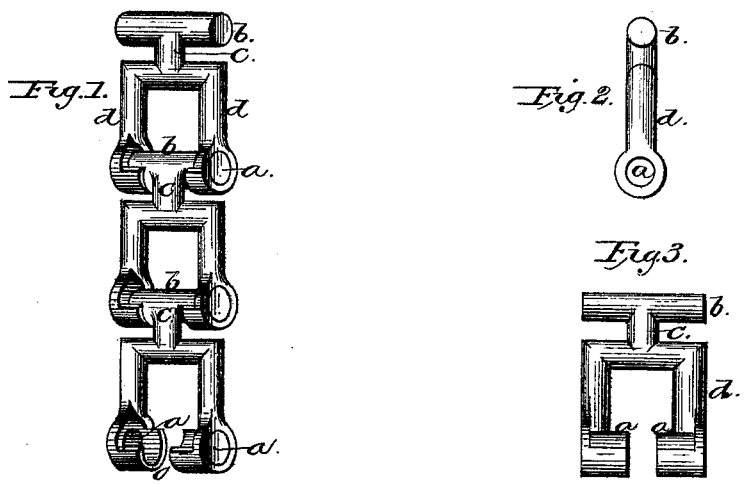
Witnesses:  Inventor:
Elias Mc. Morgan

UNITED STATES PATENT OFFICE.

ELIAS M. MORGAN, OF BELLEVILLE, ILLINOIS, ASSIGNOR OF ONE-HALF HIS RIGHT TO HENRY RENTCHLER, OF SAME PLACE.

IMPROVEMENT IN DRIVE-CHAINS.

Specification forming part of Letters Patent No. 180,907, dated August 8, 1876; application filed January 3, 1876.

*To all whom it may concern:*

Be it known that I, ELIAS M. MORGAN, of Belleville, St. Clair county, Illinois, have invented an Improvement in Drive-Chains, of which the following is a specification:

The object of my invention is to provide a drive-chain composed of links, rectangular in form preferred, that may be put together and taken apart without bending, riveting, or altering the links.

Figure 1 of the drawing represents a top view or plan of my drive-chain. Fig. 2 is a sectional view of a link of the same. Fig. 3 is a top view of a link of the same. Fig. 4 is a detailed view, showing a method of attaching together the links of my drive-chain.

My invention relates to drive-chains used with sprocket-wheels or pulleys on harvesting and other machines and machinery; and consists in the construction of a novel link, as shown in Fig. 3, open at $a$, having journal-bearings $a$ in side bars $d$, near open end, and a T or cross-bar, $b$, connection with the closed or opposite end. The journal-bearings $a$ are cut out on upper sides to permit the entrance of the cross-bar $b$. The cross-bar $b$ is connected with closed end of link by bar $c$.

For the purpose of putting the links together the openings or cut-outs are made in the journal-bearings $a$. By inserting the cross-bar $b$ in the journal-bearings $a$, by means of these cut-outs, the links are put together and formed into a chain.

The chain can be taken apart or shortened by taking cross-bar $b$ out of the journal-bearings $a$, thus disconnecting the links. The chain can be lengthened by putting the links together, as aforesaid.

The advantages of my invention are: the links are put together and taken apart without any bending, riveting, or altering, and are not liable to disconnect when the chain is in use. The bearings $a$, being closed, are not liable to disconnect when worn by long-continued use, as in the case of chains put together with hooks.

The link may be cast in the usual way, or made in any suitable manner, with the bearings $a$ in the side bars near their open ends, and the T-shaped attachment to its cross-bar. By placing the cross-bar of said T attachment in the said bearings $a$, when one link is in a position to the other nearly at a right angle, a connection is effected; then, by placing the links in their natural position in the chain, a disconnection cannot take place.

I do not claim a link with a tubular end bar.

What I claim as new, and desire to secure by Letters Patent, is—

A link for drive-chains, constructed with the bearings $a\ a$ at the free ends of the side bars, and the end bar provided with a T-shaped coupling attachment, adapted to be united to an adjacent link, substantially in the manner and for the purpose specified.

ELIAS M. MORGAN.

Witnesses:
W. P. PENN,
HENRY RENTCHLER.